United States Patent [19]
Rollins

[11] Patent Number: 4,556,832
[45] Date of Patent: Dec. 3, 1985

[54] CONTROL VALVE APPARATUS

[75] Inventor: John P. Rollins, Lancaster, S.C.

[73] Assignee: Duff-Norton Company, Inc., Charlotte, N.C.

[21] Appl. No.: 587,669

[22] Filed: Mar. 8, 1984

[51] Int. Cl.⁴ .......................... H02P 1/08; G05D 3/00
[52] U.S. Cl. .................................... 318/467; 318/266; 318/468; 251/129.12; 137/625.21
[58] Field of Search ...................... 251/134, 129, 130; 137/625.22, 625.21, 624.27, 625.64, 625.65; 318/128, 266, 286, 467, 468; 192/8 R

[56] References Cited

U.S. PATENT DOCUMENTS

| | | | |
|---|---|---|---|
| 2,316,003 | 4/1943 | Kriechbaum | 251/134 X |
| 2,451,989 | 10/1948 | Smith | 318/266 |
| 3,394,292 | 7/1968 | Flum | 318/468 X |
| 3,520,332 | 7/1970 | Willard | 251/134 X |
| 3,559,499 | 2/1971 | Profet | 74/424.8 R |
| 3,680,831 | 8/1972 | Fujiwara | 251/134 |
| 3,862,739 | 1/1975 | Fujiwara | 251/134 X |
| 3,873,066 | 3/1975 | Opyrchal | 188/83 X |

Primary Examiner—William M. Shoop, Jr.
Assistant Examiner—Bentsu Ro
Attorney, Agent, or Firm—Shefte, Pinckney & Sawyer

[57] ABSTRACT

Apparatus for electrically controlling actuation and deactuation of a hydraulic fluid directional control valve between centered, forwardly-moved and reversely-moved positions thereof includes a reversible electric motor whose drive train is connected to the valve control member for forward and reverse rotation thereof and an arrangement of two forward and two reverse electric circuits between an electrical source and the motor, two manual switches each in associated forward and reverse circuits, four limit switches positioned each in one circuit, and cams mounted on the motor drive train to open and close the limit switches in relation to the rotational disposition of the drive train to provide for manual actuation by the manual switches of selected forward and reverse rotation of the motor drive train and valve control member, for automatic deactuation of the electric motor by the limit switches at each of the two predetermined rotated dispositions of the valve member, for selective holding of the valve member at its operative rotated dispositions by continued manual engagement of the manual switches, for automatically actuating the electric motor cooperatively by the manual and limit switches upon release of the manual switches for opposite return rotation of the drive train and valve control member, and for automatically deactuating the electric motor by the limit switches upon return of the drive train and valve control member to their original centered disposition.

18 Claims, 13 Drawing Figures

CONTROL VALVE APPARATUS

BACKGROUND OF THE INVENTION

The present invention relates generally to control valves, particularly for fluid flow control in a hydraulic fluid flow system, and relates more specifically to apparatus for electrically controlling the operational positioning of such control valves.

Various forms of electrically-operated valve apparatus are known wherein an electric motor is operatively connected to a valve for selective movement of the valve between open and closed positions upon manual operation of a control switch or switches, with limit or other positioning switches being provided to automatically stop the operation of the motor when the valve attains the desired open or closed position, example of such apparatus being disclosed and described in U.S. Pat. Nos. 3,520,332; 3,680,831; and 3,862,739. Such valve apparatus typically requires initial manual actuation of each valve movement, whereby operative movement of the valve to one open position requires manual actuation of an appropriate manually-operable switch, such movement being stopped by an associated limit switch, and return movement of the valve to its closed position requires a separate subsequent manual actuation of a manually-operable switch with another associated limit switch stopping such return movement of the valve. Such valve apparatus have the disadvantage that the distraction, forgetfulness, preoccupation or similar negligence of the operator may cause him to leave the valve apparatus running unattended past the point at which it is desired to stop the valve's operation. Such occurences create the danger that the unattended apparatus may potentially cause injury to the operator or other workers and may damage the apparatus or the workpiece on which it is operating.

Other valve apparatus are known wherein one or more electrically-actuated solenoids are employed to control movement of the valve to its operative disposition or disposition upon actuation of the appropriate solenoid and to cause the valve to automatically return to its original starting disposition upon deactuation of the solenoid. However, while such solenoid-operated valve apparatus overcome the aforementioned disadvantages of limit switch controlled valve apparatus, the solenoid-operated valve apparatus are generally more expensive than comparable limit switch controlled apparatus because of the more expensive solenoid components and furthermore are less reliable in that they require more frequent repairs and have a generally shorter lifespan making tham unsuitable for heavy duty applications requiring repetitive solenoid operation.

In contrast, the present invention provides electrically-operated control valve apparatus wherein only the initial actuation of movement of the valve from its closed position to an open operative position must be performed manually, the movement of the valve being automatically deactuated at the operative position and the return movement of the valve to its closed position being automatically effected upon cessation of the manual valve actuation.

SUMMARY OF THE INVENTION

Briefly described, the control valve apparatus of the present invention includes a valve movable between two operative positions and an intermediate inoperative position, a reversible electric motor, a drive shaft rotatable drivenly by the motor and operatively connected with the valve for actuating its movements, and an operating arrangement for electrically controlling operation of the electric motor. The operating arrangement includes electrical circuitry for electrically connecting the electric motor with a source of electrical current for rotation of the drive shaft in opposite directions. A switching arrangement is provided in the electrical circuitry for selective manual actuation of the electric motor for rotation of the drive shaft in its opposite directions from a centered position wherein the valve is in its intermediate inoperative position, for automatically deactuating the electric motor from rotation of the drive shaft at each of two moved positions thereof rotated from the centered postion respectively in the opposite directions wherein the valve is respectively in its two operative positions, and for automatically actuating reverse operation of the electric motor upon cessation of the manual actuation thereof for reverse rotation of the drive shaft in return to its centered position.

In the preferred embodiment, the electrical circuitry includes a first primary circuit for rotating the drive shaft in one direction, a second primary circuit for rotating it in the opposite direction, a first secondary circuit also for rotating it in such opposite direction, and a second secondary circuit for rotating it in the aforesaid one direction. A first manual switch is provided in the first primary and first secondary circuits for selectively closing one thereof while simultaneously opening the other thereof, the first manual switch preferably being biased to a normal position open in the first primary circuit and closed in the first secondary circuit and being manually actuable to an actuated position closed in the first primary circuit and open in the first secondary circuit. A second manual switch is provided in the second primary and second secondary circuits for selectively closing one thereof while simultaneously opening the other thereof, the second manual switch preferably being biased to a normal position open in the second primary circuit and closed in the second secondary circuit and being manually actuable to an actuated position closed in the second primary circuit and open in the second secondary circuit. A secondary switch is provided in each of the aforesaid primary and secondary circuits. A cam arrangement is mounted on the drive shaft for closing the secondary switch in the first and second primary circuits and opening the secondary switch in the first and second secondary circuits when the drive shaft is in its centered position, for opening the secondary switch in the first primary circuit and closing the secondary switch in the first secondary circuit when the drive shaft is on one moved position rotated in one direction from the centered position corresponding to one operative position of the valve, and for opening the secondary switch in the second primary circuit and closing the secondary switch in the second secondary circuit when the drive shaft is in its other moved position rotated in the opposite direction from the centered position corresponding to the other operative position of the valve. Preferably, the cam arrangement is also operative to close the secondary switch in the second primary circuit and open the secondary switch in the second secondary circuit when the drive shaft is in its aforesaid one moved position and to close the secondary switch in the first primary circuit and open the secondary switch in the first secondary circuit when the drive shaft is in its aforesaid other moved position. In this manner, the described operating arrangement permits selective manual actuation of the electric motor by the manual switches for rotation of the drive shaft from its centered position selectively to its two moved positions and is operative to automatically rotate the drive shaft in reverse from either moved position to the centered position upon cessation of the manual actuation of the selected manual switch.

Preferably, the secondary switches in the first and second primary circuits are disposed at a predetermined circumferential spacing about the drive shaft coplanarly with a first cam profiled circumferentially of the shaft for controlling the aforestated opening and closing of such secondary switches. Similarly, the secondary switches in the first and second secondary circuits are disposed at the same predetermined circumferential spacing about the shaft coplanarly with a second cam profiled for controlling the aforesaid opening and closing of such secondary switches. The secondary switches and their associated controlling cams are arranged in stacked relationship for compactness.

DESCRIPTION OF THE PREFERRED EMBODIMENT

Figures 1, 7, 8, 9:
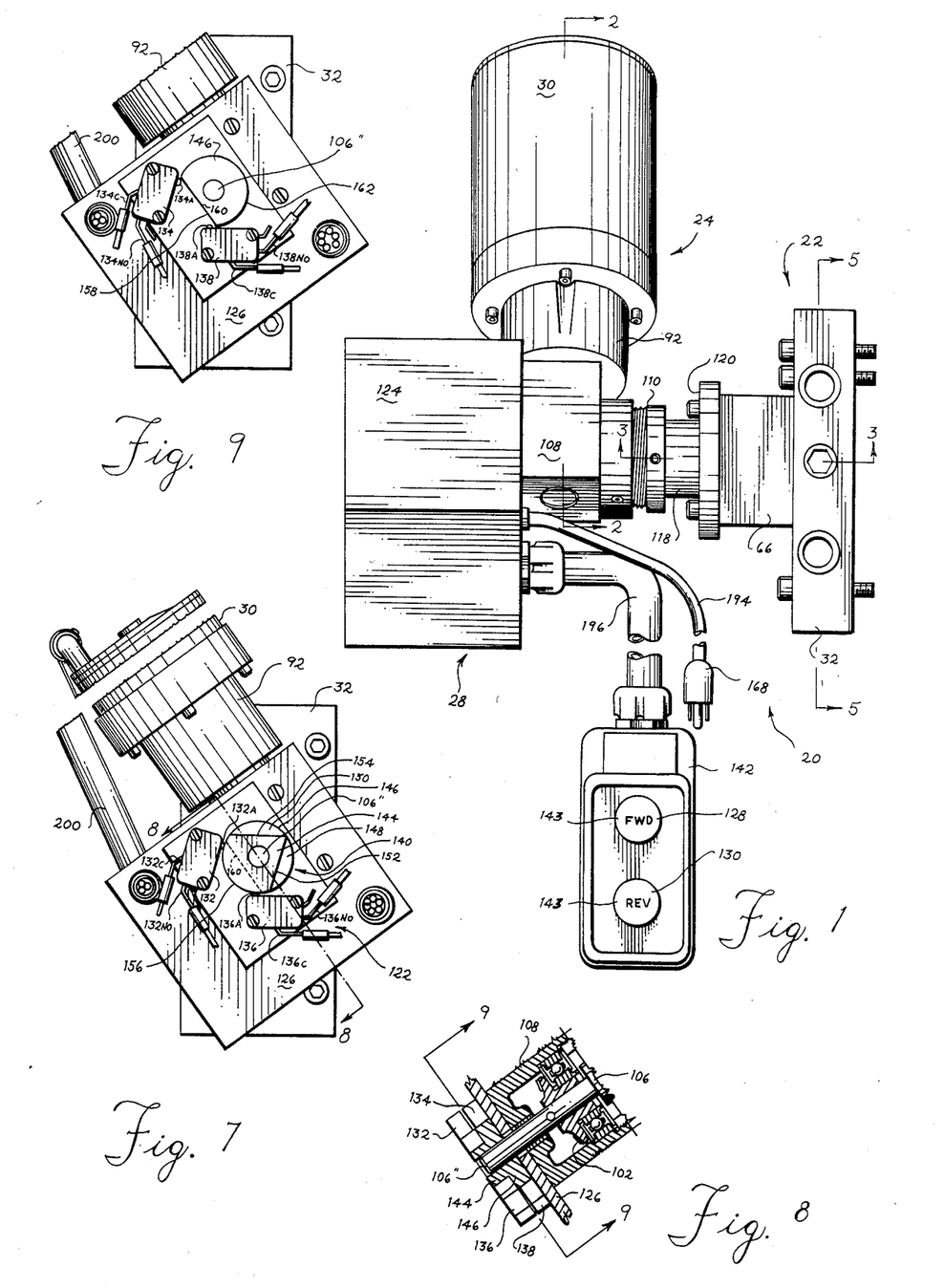
FIG. 1 is a front elevational view of the preferred embodiment of the control valve apparatus of the present invention.
FIG. 7 is an end elevational view of the control valve apparatus of FIG. 1 with the housing cover of the central components of the electrical circuitry and switching arrangement removed.
FIG. 8 is a vertical cross-sectional view of a portion of the drive shaft assembly of the electrical motor and of the electrical circuitry and switching arrangement of FIG. 7 taken along line 8—8 thereof.
FIG. 9 is a vertical cross-sectional view of the electrical circuitry and switching arrangement of FIG. 8 taken along line 9—9 thereof.
Figure 6:
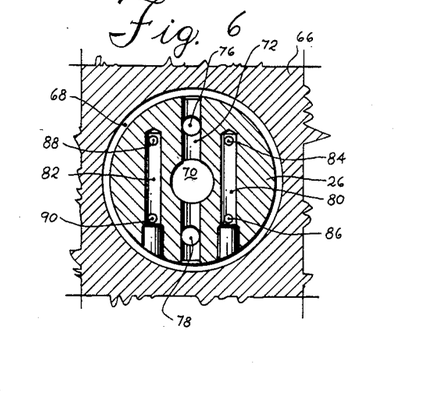
FIG. 6 is a vertical cross-sectional view of the valve assembly of FIG. 3 taken along line 6—6 thereof.

Referring now to the accompanying drawings and initially to FIG. 1, a control valve apparatus according to the present invention is indicated generally at 20 in one preferred embodiment thereof as would typically be employed to actuate the reciprocal movement of a double-acting hydraulic cylinder (not shown), e.g. for controlling the forward and reverse movements of hydraulic presses and for like applications. The control valve apparatus 20 basically includes a hydraulic fluid flow control valve assembly indicated generally at 22, an electric motor operated actuator assembly generally indicated at 24 operatively connected with the valve assembly 22 for actuating movement of its valve control drum 26 (FIG. 6), and an arrangement of electrical circuitry and switches indicated generally at 28 for selectively controlling the operation of the electric motor 30 to in turn control the actuation of the operational movements of the valve control drum 26. As will be understood, the valve assembly 22 of the present invention will be operatively connected with a conventional hydraulic fluid pump and fluid reservoir and with the aforementioned double-acting hydraulic cylinder. However, as these components form no part of the present invention and furthermore are well known and their operative arrangement with the valve assembly 22 will be readily recognized and understood by those persons skilled in the art, these conventional components are not shown in the drawings or described in this specification to enhance the clarity of illustration and succinctness of the description and understanding of the present invention.

The valve assembly 22 is best seen in FIGS. 3-6, and is of the conventional four-way, three-position, tandem center type adapted for operation with a continuously cycling hydraulic fluid pump. As such, the construction and operation of the valve assembly 22 is well known and is described herein only to the extent necessary to facilitate a complete understanding of the construction and operation of the present invention. The valve assembly 22 includes a manifold 32 having a network 34 of successively communicating fluid inlet passageways 36,38,40 (FIG. 5) for receiving hydraulic fluid from the pressure side of the hydraulic pump by the conventional connection of passageway 36 therewith. The manifold 32 further includes a network 42 of successively communicating fluid return passageways 44,46 (FIG. 5) for recirculating fluid return to the pump reservoir by conventional connection of the passageway 46 therewith. A first network 48 of successively communicating active fluid passageways 50,52,54 (FIG. 5), is also provided in the manifold 32 for directing hydraulic fluid to one side of the double-acting cylinder by the conventional connection of the passageway 54 therewith. A second network 56 of successively communicating active fluid passageways 58,60,62 (FIG. 5) is similarly provided in the manifold 32 for directing hydraulic fluid to the other side of the double-acting cylinder by the conventional connection of passageway 62 therewith. The respective passageways 40,44,50,58 of the passageway networks 34,42,48,56 open to the inward face 64 of the manifold 32 at equally spaced concentric locations with the inlet passageway 40 and the return passageway 44 diametrically opposed to one another and with the active passageways 50,58 diametrically opposed to one another.

The valve assembly 22 also includes a valve body 66 bolted to the inward face 64 of the manifold 32. The valve body 66 contains the valve control drum 26 in a cylindrical cavity 68 pinned to a rotatable supporting shaft 70 and the valve body 66 has four concentrically arranged, equally spaced passageways 71,73,75,77 which extend axially from the cavity 68 and open to the face 79 of the valve body at the manifold face 64 in correspondence and communication with its passageways 40,44,50,58. A check ball 81 is disposed in the inlet passageway 40 of the manifold 32 to yield to fluid pressure from the pump to permit positive fluid flow therefrom, while preventing reverse flow of the fluid into the inlet passageway network 34. The corresponding inlet passageway 71 of the valve body 66 is fitted with a slotted annular spacer 83 to prevent seated closure of the passageway 71 by the check ball 81 and thereby to permit pressurized fluid passage from the passageway 40 to the passageway 71.

Figure 3:
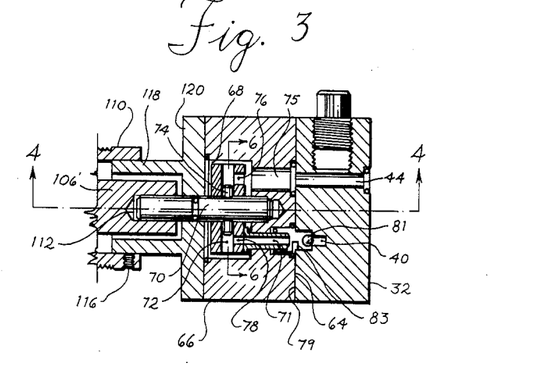
FIG. 3 is a horizontal cross-sectional view of the valve assembly of the control valve apparatus of FIG. 1 taken along line 3—3 thereof.
Figure 4:
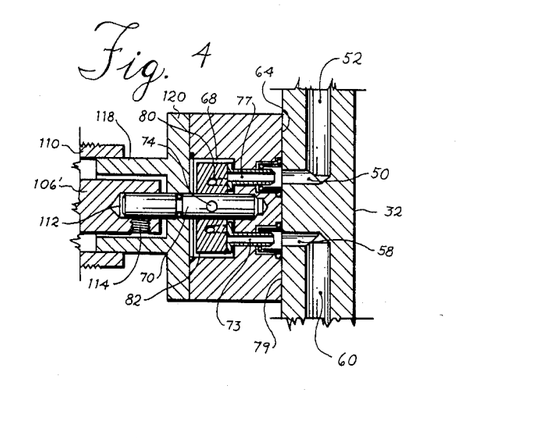
FIG. 4 is a horizontal cross-sectional view of the valve control assembly of FIG. 3 taken along line 4—4 thereof.
Figure 5:
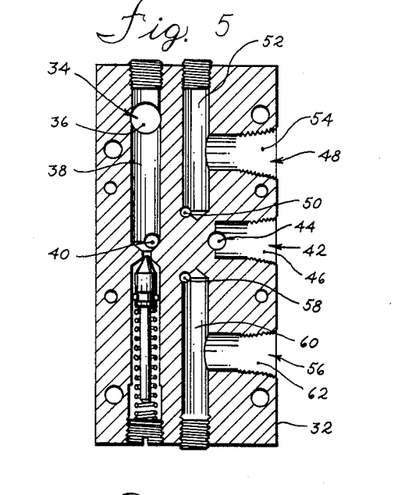
FIG. 5 is a vertical cross-sectional view of the manifold portion of the valve assembly of the control valve apparatus of FIG. 1 taken along line 5—5 thereof.

The valve control drum 26 includes a diametric passageway 72 in which a tubular retaining pin 74 is fitted to pin the drum 26 to the shaft 70 as aforementioned. The diametric passageway 72 opens through radially oppositely located axial passageways 76,78 toward the valve body passageways 71,73,75,77. The valve control drum 26 also includes two passageways 80,82 oriented along chords parallel to the diametric passageway 72 at equal spacings on opposite sides thereof, each of the chordal passageways 80,82 opening at locations at their opposite ends through respective passageways 84,86 and 88,90 axially toward the valve body passageways 71,73,75,77. The axial passageways 76,78,84,86,88,90 are concentrically arranged at 45 degree spacings in correspondence with the concentric arrangements of the valve body passageways 71,73,75,77 and the manifold passageways 40,44,50,58. Thus, in a centered inoperative position of the control drum 26, the axial passageways 76,78 of the diametric passageway 72 of the control drum 26 are respectively in correspondence and communication with the valve body passageway 71 and the manifold inlet passageway 40 and with the valve body passageway 75 and the manifold return passageway 44 for continuous recirculation of hydraulic fluid between the pump and its reservoir. The other axial passageways 84,86,88,90 are out of communication with any valve body or manifold passageway in such centered position of the control drum 26. This centered position of the control drum 26 is illustrated in FIGS. 3 and 4. At each of two operative positions of the control drum 26 rotated 45 degress in respective opposite directions from the centered position, the axial passageways 84,86 or 88,90 of one of the chordal passageways 80,82 are in respective correspondence and communication with the valve body passageway 71 and the manifold inlet passageway 40 and with one of the valve body passageways 73 or 77 and the corresponding manifold passageways 50 or 58 for directing pressurized fluid from the pump to one side of the double-acting cylinder. In each such operative position of the control drum 26, the axial passageways 84,86 or 88,90 of the other chordal passageway 80 or 82 is in correspondence and communication with the other valve body passageway 73 or 77 and its corresponding manifold passageway 50 or 58 and with the valve body return passageway 75 and its corresponding manifold return passageway 44 for exhausting hydraulic fluid from the other side of the double-acting cylinder for return to the pump reservoir. The valve assembly 22 as described is of the type presently manufactured and sold commercially under the model designation HV-4 by Duff-Norton Company, Inc., Charlotte, N.C., the assignee hereof. Other equivalent four-way, three-position, tandem center valve assemblies could be substituted for the valve assembly 22 without departing from the scope and substance of the present invention.

Figure 2:
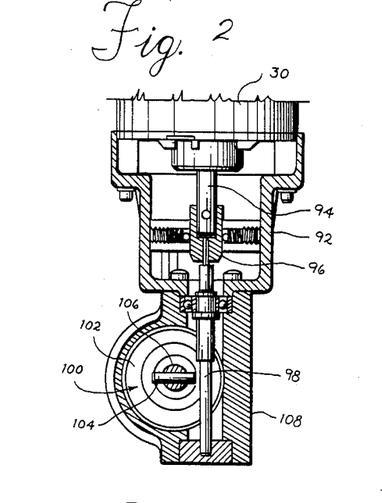
FIG. 2 is a vertical cross-sectional view through the electric motor and drive shaft arrangement of the control valve apparatus of FIG. 1 taken along line 2—2 thereof.

The actuator assembly 24 includes a housing 92 to which the electric drive motor 30 is secured with its drive shaft 94 projecting into the housing 92 and drivingly connected by a transmission mechanism 96 coaxially to the pinion shaft 98 of a skew-axis screw-type gear set 100 for driving the gear set 100 to translate rotation of the motor drive shaft 94 ninety degrees to the driven radial-toothed gear 102 of the gear set 100. As described, the actuator assembly 24 is of the type disclosed in U.S. Pat. Nos. 3,559,499 and 3,873,066, presently manufactured and sold commercially under the trademark MINI PAC by Duff-Norton Company, Inc., of Charlotte, N.C. The construction and operation of this type of actuator assembly 24 is conventional and well known and need not be further described herein. Reference may be had to the aforementioned U.S. Patents for a more complete description of the construction and operation of the actuator assembly 24.

The facing ends of the gear set housing 108 and the valve body 66 are affixed by a connecting sleeve 110 threadedly engaged internally with the gear set housing 108 and fitted annularly about and fixed by a set screw 116 to a projecting sleeve 118 on an adapter cap 120 affixed to the valve body 66. The radial toothed gear 102 of the gear set 100 is fixed by a pin 104 to a supporting shaft 106 rotatably journaled in the gear set housing 108. The supporting shaft 106 extends through the connecting sleeve 110 and has a central axial recess 112 in its end 106' which receives the outward end of the shaft 70 for the valve control drum 26 and is fixed thereto by a set screw 114 thereby for unitary rotation of the shafts 106 and 70. In this manner, the transmisssion mechanism 96, the gear set 100, and the shafts 106 and 70 provide a drive train between the electric motor 30 and the valve control drum 26 for transmitting rotational movement thereto.

Figures 10, 11:
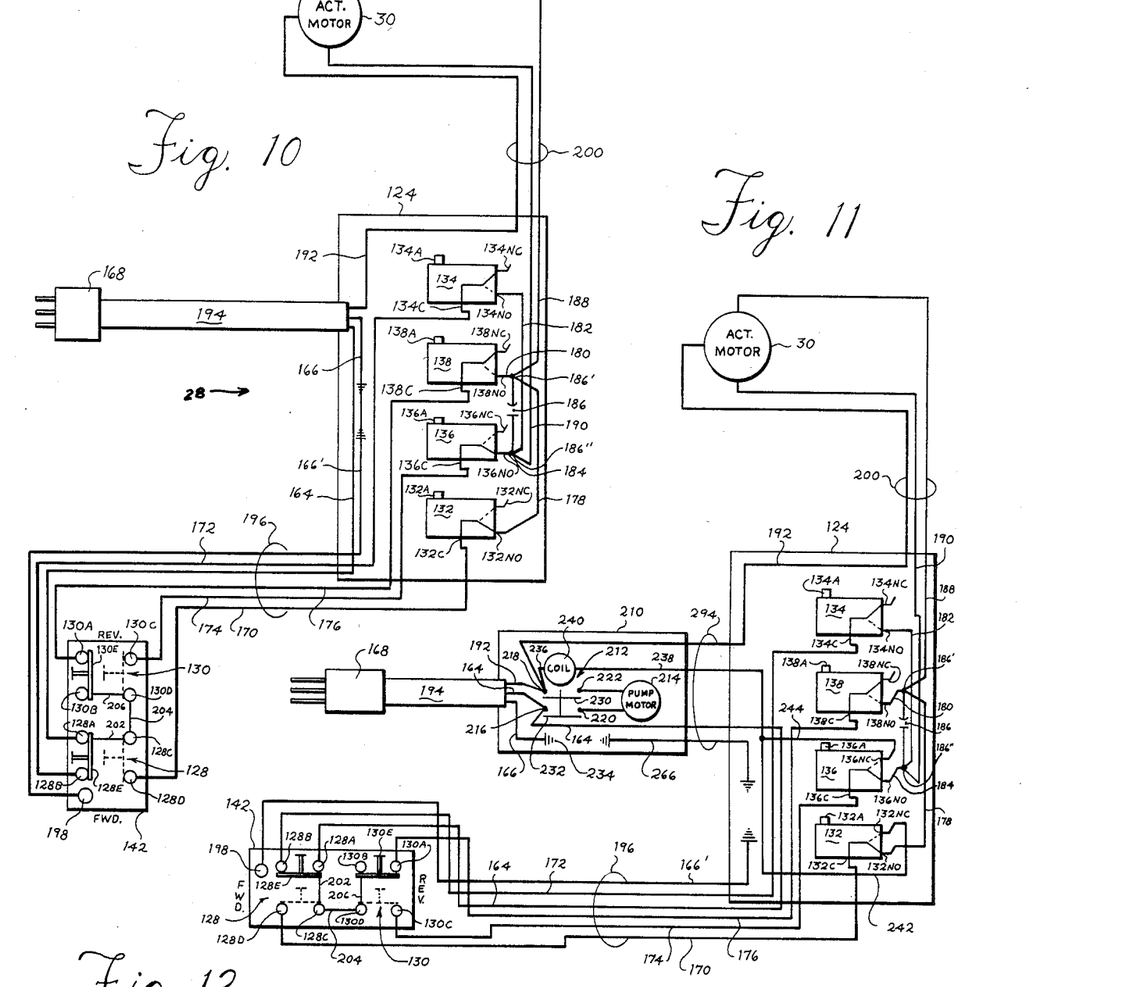
FIG. 10 is a schematic diagram of the electrical circuitry and switching arrangement for one embodiment of the control valve apparatus of the present invention.
FIG. 11 is a schematic diagram of the electrical circuitry and switching arrangement for another embodiment of the control valve apparatus of the present invention.

The electrical circuitry and switching arrangement 28 is illustrated schematically in FIG. 10 and its mechanical structure is illustrated in FIG. 7 at 122. Most of the electrical circuitry and switching arrangement 28 is contained in a housing 124 mounted on a support plate 126 fixed to the end of the gear set housing 108 opposite the valve assembly 22 into which housing 124 extends the opposite end 106" of the supporting shaft 106 for the radial toothed gear 102. The electrical circuitry and switching arrangement 28 basically includes electrical circuitry (FIG. 10) for operatively connecting the electric motor 30 with a source of electricity to permit completion of four possible circuits therebetween for reversable operation of the motor 30 to rotate its drive train in either of its two possible rotational directions. Two manually operable switch assemblies 128,130 are provided in the electrical circuitry, each of which is operable for selectively completing a respective electric circuit between the electric source and the motor 30 to actuate its rotation from the centered inoperative position of its drive train in one of the two rotational directions. A set of four secondary, limit switches 132,134,136,138 are provided in the electrical circuitry with one such limit switch in each of the four aforementioned circuits for automatically either opening or completing the circuits to start and stop operation of the electric motor 30 to restrict its drive train to rotation incrementally between its centered inoperative position and its two operative positions rotated in the respective opposite directions from the centered position wherein the control drum 26 is in its two operative positions and further to automatically return the drive train of the motor 30 to its centered position following completion of each manual switch actuation. A cam arrangement indicated generally at 140 in FIG. 7 is fixedly mounted on the extending end 106" of the shaft 106 in the housing 124, the limit switches 132,134,136,138 being mounted on the support plate 126 peripherally about the cam arrangement 140 to be opened and closed thereby in relation to the rotational disposition of the drive train of the motor 30.

The manual switch assemblies 128,130 are housed in a conventional switch station box 142 and are each of the conventional "momentary" pushbutton type respectively having four electrical terminal contacts 128A–D and 130A–D arranged in spaced pairs with a bar switch member 128E and 130E spring-biased into electrical contact across one pair of contacts 128A,128B and 130A,130B, as indicated in full lines in FIG. 10 and conventionally designated the "normally closed" position of the switches, and actuable by depression of a supporting button 143 (FIG. 1) against the biasing spring into electrical contact across the other pair of contacts 128C,128D and 130C,130D, as indicated in broken lines in FIG. 10 and conventionally designated as the "normally open" position of the switches. The manual switch assembly 128 is designated "forward" for actuating rotation of the drive train of the electric motor 30 in one rotational direction as more fully described hereinafter to position the control drum 26 for directing hydraulic fluid to operate the double-acting cylinder in its "forward" direction. The other manual switch assembly 130 is conversely designated "reverse" for actuating counter rotation of the motor drive train to position the control drum 26 for directing hydraulic fluid to the other side of the double-acting cyclinder for moving it in the opposite "reverse" direction.

Referring now to FIGS. 7–9, the cam arrangement 140 includes a pair of cam disks 144,146 fixedly mounted in adjacent stacked relation on the extending end 106" of the shaft 106. The cam disks 144,146 are each formed from circular disks and are coaxially mounted on the shaft 106. The cam disk 144 has two equal segmental portions thereof removed contiguously at 148,150 leaving end-intersecting chordal sections 152,154 and a non-segmented arcuate section 156 therebetween. The cam disk 146 has a single segmental portion thereof removed at 158 leaving a chordal section 160 which intersects the circumference of the cam disk 146 at equal relatively small arcuate spacings less than 45 degrees from the diverging ends of the chordal sections 152,154 of the cam disk 144 and leaving a continuous arcuate section 162 extending between the ends of the chordal section 160. Thus, the segmented portion 158 of the cam disk 146 is disposed in centered axial correspondence with the non-segmented arcuate portion 156 of the cam disk 144 and the non-segmented arcuate section 162 of the cam disk 146 is in centered axial correspondence to the segmented portions 148,150 of the cam disk 144 and partially overlaps equilaterally to less than a 45 degree extent the non-segmented portion 156 of the cam disk 144.

The four limit switches 132,134,136,138 are mounted in two stacked pairs in correspondence with and respectively adjacent opposite sides of the assembly of the cam disks 144,146 such that the opposite pair of switches 132,136 are peripherally adjacent the cam disk 144 for engaging operation thereby and the pair of switches 134,138 are peripherally adjacent the cam disk 146 for engaging operation thereby. The limit switches 132,134,136,138 are of the conventional micro-switch type each having a "common" terminal designated at C in FIG. 10, a "normally open" terminal designated at NO and a "normally closed" terminal designated at NC in combination with an internal switch mechanism (not shown) operated by an actuating button designated at A which is spring-biased to an "open" condition of the limit switch electrically connecting the common terminal C with the normally closed terminal NC and moved upon depression of the button to a "closed" condition of the limit switch to electrically connect the common terminal C with the normally open terminal NO. The limit switches 132,136 adjacent and in association with the cam disk 144 are positioned at locations circumferentially of the supporting shaft 106 so that, when the shaft 106 is in the centered inoperative position of the drive train and the valve control drum 26, the buttons 132A,136A engage the arcuate section 156 of the cam 144 at substantially respective 45 degree spacings from the diverging ends of the chordal sections 152,154 to close both limit switches 132,136. Thus, when the drive train of the motor 30 is rotated in either direction, the limit switch 132 or 136 away from which the supporting shaft 106 is rotated remains closed until the shaft 106 has rotated 45 degrees whereupon such limit switch opens, while the other limit switch 132 or 136 toward which the supporting shaft 106 is rotated remains closed through the full range of such 45 degree rotational movement. The limit switches 134,138 adjacent and associated with the cam disk 146 are respectively stacked and affixed to the limit switches 132,136 in the identical corresponding disposition circumferentially relative to the supporting shaft 106. Thus, when the supporting shaft 106 is in the centered inoperative position, the buttons 134A,138A of the limit switches 134,138 extend unengaged into the removed segmented area 158 of the cam disk 146 at respective spacings less than 45 degrees from the adjacent opposite ends of the remaining arcuate section 162 of the cam disk 146 which spacings notably are less than the aforementioned 45 degree spacings of the limit switches 132,136 from the removed segmented areas 148,150 of their associated cam disk 144. Thus, when the shaft 106 is rotated with the drive train in either direction from the centered inoperative position, the limit switch 134 or 138 away from which the shaft 106 rotates is engaged and closed by the adjacent end portion of the remaining arcuate section 162 of the cam disk 146 after only a relatively small degree of rotation less than 45 degrees and notably prior to disengagement and opening of the oppositely disposed limit switch 132 or 136 by its associated cam disk 144, while the other limit switch 134 or 138 toward which the shaft 106 is rotated remains open through the full range of such 45 degree rotational movement.

Referring now to the schematic diagram of the electrical circuitry and switching arrangement 28 of FIG. 10, the electrical circuitry basicallly includes a set of two electrical leads 164,166 extending between a conventional electrical connector 168 adapted for connection to a conventional electrical outlet (not shown) and the manual switch assemblies 128,130 in the switch box 142, a set of four electrical leads 170,172,174,176 extending between the manual switch assemblies 128,130 and the limit switches 132,134,136,138, a set of four electrical leads 178,180,182,184 extending between the limit switches 132,134,136,138 and a condensor 186, a set of two electrical leads 188,190 extending between the condensor 186 and the electric motor 30, and an electrical lead 192 extending between the electrical motor 30 and the connector 168. The electrical connector 168 is of the conventional three-prong type to which are connected three conventional leads, i.e. the "hot" lead 164, commonly referred to as the "L1" lead, the "neutral" or return lead 192, commonly referred to as the "L2" lead, and the ground lead 166. These leads 164,166,192 are individually shielded and collectively contained in a conventional cable 194 extending into the housing 124. The hot lead 164 extends from the housing 124 through another cable 196 to the switch box 142 wherein the lead 164 is connected electrically to the "normally closed" contact 128A of the "forward" manual switch assembly 128. The ground lead 166 is electrically affixed to an appropriate metal surface in the housing 124, preferably the support plate 126, for conventional grounding of the lead 166. Another ground lead 166' is correspondingly electrically affixed to the support plate 126 or other metal surface of the housing 124 and extends through the cable 196 to the switch box 142 wherein the lead 166' is affixed to the designated ground terminal 198 therein. The neutral lead 192 extends from the housing 124 through a third cable 200 to the electrical motor 30 wherein the lead 192 is electrically connected to the corresponding neutral terminal (not shown) of the motor 30. The lead 172 is electrically connected to the other "normally closed" contact 128B of the "forward" manual switch 128 and extends through the cable 196 into the housing 124 wherein the lead 172 is electrically connected to the common terminal 134C of the limit switch 134. The lead 176 is electrically connected to the "normally closed" contact 130A of the "reverse" manual switch 130 and extends therefrom through the cable 196 into the housing 124 wherein the lead 176 is electrically connected to the "common" terminal 138C of the limit switch 138. The lead 170 is electrically connected to the "normally open" contact 128D of the "forward" manual switch 128 and extends therefrom through the cable 196 into the housing 124 wherein the lead 170 is electrically conncected to the "common" terminal 132C of the limit switch 132. The lead 174 is electrically connected to the "normally open" contact 130C of the "reverse" manual switch 130 and extends therefrom through the cable 196 into the housing 124 wherein the lead 174 is electrically connected to the "common" terminal 136C of th limit switch 136. Within the switch box 142 a lead 202 is electrically connected to and extends between the "normally closed" contact 128A and the "normally open" contact 128C of the manual switch 128. Another lead 204 is electrically connected to and extends between the "normally open" contact 128C of the manual switch assembly 128 and the "normally open" contact 130D of the manual switch assembly 130. Another lead 206 is electrically connected to and extends between the "normally open" contact 130D and the "normally closed" contact 130B of the manual switch assembly 130. The lead 178 is electrically connected to the "normally open" terminal 132NO of the limit switch 132 and the lead 180 is electrically connected to the "normally open" terminal 138NO of the limit switch 138, each of the leads 178,180 extending from its respective limit switch 132,138 to one terminal 186' of the condensor 186. The lead 182 is electrically connected to the "normally open" terminal 134NO of the limit switch 134 and the lead 184 is electrically connected to the "normally open" terminal 136NO of the limit switch 136, each of the leads 182,184 extending to and being electrically connected with the other terminal 186" of the condensor 186. The lead 188 is electrically connected with the condensor terminal 186' and extends therefrom through a cable 200 to and is electrically connected with the "forward" designated terminal connection (not shown) of the electrical motor 30, which is operative when electrically energized to complete an electrical circuit between the "forward" and the "neutral" terminals of the motor 30 to operate it to rotate its drive shaft in the "forward" direction. The lead 190 is electrically connected with the other condensor terminal 186" and extends therefrom through the cable 200 to and is electrically connected with the "reverse" designated terminal of the electric motor 30, which is operative when electrically energized to complete an electrical circuit between the "reverse" and the "neutral" terminals of the motor 30 to cause rotation of the motor drive shaft in its "reverse" direction. No electrical leads are connected to the "normally closed" terminals of the limit switches 132,134,136,138.

Figure 12:
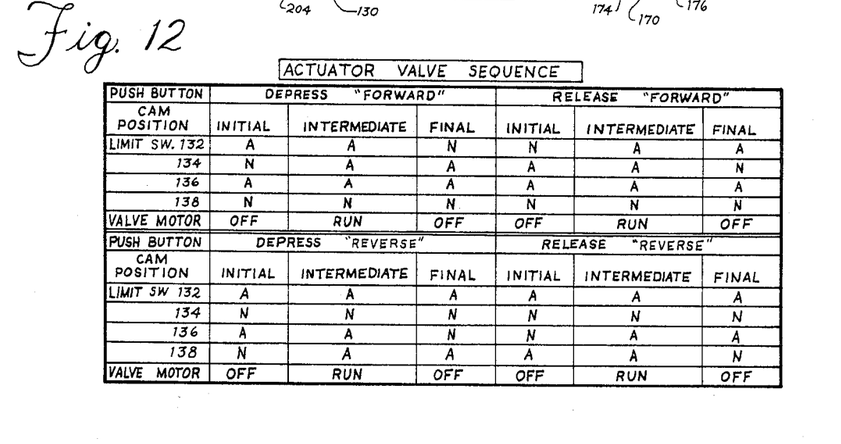
FIG. 12 is a truth table of the operational conditions of the limit switches of the electrical circuitry and switching arrangement at various stages in the operation of the control valve apparatus of the present invention.

The operation of the control valve apparatus 20 will thus be understood with reference to the "truth table" of FIG. 12 which indicates the cam controlled open and closed conditions of each limit switch 132,134,136,138 by the symbol "A" designating the "actuated" or "closed" condition of the limit switches wherein their buttons are depressed to connect their "common" and "normally open" terminals and "N" designating the "non-actuated" or "closed" condition of the limit switches wherein their buttons are not depressed leaving their "common" and "normally closed" terminals connected. When neither of the manual switches 128,130 are actuated by depression of their buttons, the drive train of the electrical motor 30 is in its starting or "centered" position with the valve control drum 26 in its "centered" position to recirculate the hydraulic fluid between the pump and its reservoir. In such disposition of the motor drive train, the cam disk 144 is positioned to engage and depress the activating buttons 132A,136A of the limit switches 132,136 to close them, and the cam disk 146 is out of engagement with the activating buttons 134A,138A of the limit switches 134,138 to open them. Thus, no electrical circuit is completed between the electric source to which the connector 168 is connected and the electrical motor 30 whereby the described conditions of the manual and limit switches and of the electrical motor 30 will remain in equilibrium with the motor drive train in its centered disposition. When the actuating button of the forward manual switch 128 is depressed, an electrical circuit is completed through the hot lead 164 from the connector 168, the "normally closed" contact 128A of the manual switch assembly 128, the lead 202, the "normally open" contact 128C, the bar switch 128E, the "normally open" contact 128D, the lead 170, the limit switch 132 between its "common" terminal 132C and its "normally open" terminal 132NO, the lead 178, the condensor terminal 186', the lead 188, the electrical motor 30 between its "forward" and its "neutral" terminals, and the "neutral" lead 192 of the connector 168. The described electrical circuit remains completed through 45 degrees of rotation of the motor drive train until the arcuate surface 156 of the cam disk 144 is rotated with the drive train past and disengaged from the actuating button 132A of the limit switch 132 to open it and thereby break the circuit. In this moved disposition of the motor drive train, the valve control drum 26 is disposed in one of its two operative positions to direct hydraulic fluid from the pump through the valve assembly 22 to one side of the double-acting cylinder to move it in its forward direction. In the intermediate stage of the actuated forward rotational movement of the motor drive train just described, the limit switch 134 was closed by engagement with the arcuate surface 162 of the cam disk 146 as it rotated with the drive train, the limit switch 136 remained closed during such drive train rotation under the continued engagement of the arcuate surface 156 of the cam disk 144 with the limit switch 136, and the limit switch 138 remained open during such drive train rotation under the continued non-engagement of the limit switch 138 with the cam disk 146. It will thus be understood that, so long as the "forward" manual switch assembly 128 remains manually actuated following the actuation of the described "forward" rotation of the drive train, no other electrical circuit is completed and the valve control drum 26 remains in its rotated operative position to continue to direct fluid to the double-acting cylinder to move it in its "forward" direction. Once the manual switch assembly 128 is deactuated by release of its actuating button, its biasing spring returns its bar switch 128E to its "normally open" position thereby completing another electrical circuit through the hot lead 164, the "normally closed" forward manual switch contact 128A, the bar switch 128E, the "normally closed" forward manual switch contact 128B, the lead 172, the limit switch 134 between its "common" terminal 134C and its "normally open" terminal 134NO, the lead 182, the condensor terminal 186", the lead 190, the electrical motor 30 between its "reverse" and "neutral" terminals, and the lead 192 to the connector 168. This electrical circuit actuates "reverse" rotational movement of the electric motor and its drive train and will remain completed through 45 degrees rotation of the motor drive train in the "reverse" direction until the arcuate surface 162 of the cam disk 146 has rotated past and out of engagement with the limit switch 134 to open it and thereby break the circuit. As will be understood, the manual and limit switches and the electric motor are thereby returned to their original equilibrium condition with the motor drive train in its original centered position.

The control valve apparatus 20 is similarly operated when the "reverse" manual switch assembly 130 is manually actuated. In such case, an electrical circuit is completed between the electrical source to which the connector 168 is connected and the electric motor 130 through the hot lead 164, the "normally closed" forward manual switch contact 128A, the lead 202, the "normally open" forward manual switch contact 128C, the lead 204, the "normally open" reverse manual switch assembly contact 130D, the bar switch 130E, the "normally open" reverse manual switch contact 130C, the lead 174, the limit switch 136 between its "common" terminal 136C and its "normally open" terminal 136NO, the lead 184, the condensor terminal 186", the lead 190, the electrical motor 30 between its "reverse" and "neutral" terminals, and the "neutral" lead 192 to the connector 168. This electrical circuit actuates "reverse" rotational movement of the electric motor 30 and its drive train and the electrical circuit will remain completed through 45 degrees of rotation of the drive train until the arcuate surface 156 of the cam disk 144 has rotated past and disengaged from the actuating button 136A of the limit switch 136 to open it and thereby break the circuit and stop the reverse rotation of the motor 30 and its drive trian. This "reverse" rotation of the motor drive train positions the valve control drum 26 in its other operative disposition for directing hydraulic fluid from the pump to the other side of the double-acting cylinder to move it in its designated "reverse" direction. In the intermediate stage of the described rotational movement of the drive train, the limit switch 138 was closed by engagement with the arcuate surface 162 of the cam disk 146, while the limit switches 132 and 134 respectively remained closed and open under the control of the cam disks 144,146. Thus, so long as the "reverse" manual switch assembly 130 remains manually actuated following this "reverse" rotation of the motor drive train, no other electrical circuit is completed and the valve control drum 26 will remain in its other operative disposition. Once the manual switch assembly 130 is manually released, another electrical circuit is completed through the hot lead 164, the "normally closed" forward manual switch contact 128A, the lead 202, the "normally open" forward manual switch contact 128C, the lead 204, the "normally open" reverse manual switch contact 130D, the lead 206, the "normally closed" reverse manual switch contact 130B, the bar switch 130E, the "normally closed" reverse manual switch contact 130A, the lead 176, the limit switch 138 between its common terminal 138C and its "normally open" terminal 138NO, the lead 180, the condensor terminal 186', the lead 188, the electrical motor 30 between its "forward" and "neutral" terminals, and the lead 192 to the connector 168. This electrical circuit actuates "forward" rotation of the electrical motor 30 and its drive train and will remain completed through 45 degrees of "forward" rotation of the motor drive train until the arcuate surface 162 of the cam disk 146 moves past and disengages from the limit switch 138 to open it and thereby break the circuit and stop further rotational movement of the motor drive train at its original centered disposition.

As will thus be understood, the described operation of the electrical circuitry and switching arrangement 28 enables the control valve apparatus of the present invention to be operated for controlling the reciprocal movements of a double-acting cylinder by mere selective actuation of the manually-operated switch assemblies 128,130, the novel cam-operated arrangement of the limit switches 132,134, 136,138 otherwise providing automatic control of the stopping of the electric motor 30 and its drive train to accurately position the valve control member 26 at its two operative positions and furthermore to automatically actuate return movement of the electric motor and its drive train to their original neutral or "centered" starting position following each manually-actuated drive train rotational movement. The operator of the present control valve apparatus can selectively control the extent to which the double-acting cylinder is reciprocated in any manually-actuated movement by maintaining manual depression of the actuating manual switch assembly 128 or 130 until the desired reciprocal movement of the cylinder is accomplished and then releasing the switch assembly 128 or 130. Advantageously, the novel switching arrangement by which this manner of operation of the control valve apparatus is achieved provides a significant degree of safety and convenience in the operation of the control valve apparatus in that the apparatus is operative only by and during actual manual operation of the manual switch assemblies 128,130 and automatically returns to its neutral, centered disposition whenever the manual switch assemblies 128,130 are not actuated. Thus, it is not possible for an operator to leave the control valve apparatus of the present invention operating unattended thereby creating a situation hazardous to worker safety or which may potentially cause damage to the apparatus. Additionally, as a matter of convenience, the operator of the present control valve apparatus is not required to separately actuate manually both the initial movement of the valve and the return movement thereof following completion of the desired extent of each operative movement of the valve. In substantial contrast, conventional valve control apparatus of the limit switch-controlled type hereinabove described requires the operator to operate a first manual switch to actuate any operative movement of the valve and to then affirmatively actuate a second manually-operated switch to actuate return centering movement of the valve. Disadvantageously, this type of valve control apparatus prevents the danger that the operator through forgetfulness, distraction or otherwise may leave the controlling manual switches unattended and may fail to actuate reverse movement of the valve at the necessary time which may create a safety hazard to the workers in the area and may furthermore cause damage to the apparatus or any work piece on which work is being performed thereby. While other conventional solenoid-actuated valve control apparatus exists which provide comparable safety and convenience to that of the present apparatus, such solenoid-actuated apparatus is considerably more costly due to the use of solenoids and furthermore has been found to be less reliable, requiring more frequent repairs, and to have a shorter usable life span. In contrast, the present control valve apparatus has been operated in laboratory testing to complete in excess of 500,000 pressurization cycles without requiring repairs.

Figure 13:
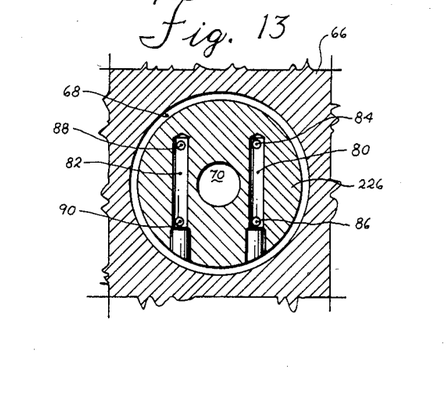
FIG. 13 is a vertical cross-sectional view similar to FIG. 6 of the valve assembly in another embodiment of the control valve apparatus of the present invention.

While the present control valve apparatus has been herein described and illustrated in an embodiment including a valve of the tandem center type, the control valve apparatus may be adapted equally well in an embodiment including a conventional closed-center valve operative in conjunction with a non-continuously operating pump. Those persons skilled in the art will understand that the structure of the valve assembly 22 in such an embodiment would be identical to that illustrated in FIGS. 2-5 except that the control drum 26 would be replaced by a control drum 226 as shown in FIG. 13 of the conventional closed-center type having the same operative chordal passageways 80,82 and their associated passageways 84,86 and 88,90 but having no diametric passageway 72 as in the tandem center type control drum 26. Thus, in the centered disposition of the electric motor and its drive train, including the valve control drum 226, no fluid circuit is provided between the fluid pump and its reservoir through which the hydraulic fluid may be recirculated. Accordingly, the fluid pump in such an embodiment must be actuated upon each movement of the valve control drum 226 into one of its two operative positions and must be deactuated upon each return movement of the valve control drum 226 to its centered position and, for this purpose, the electrical circuitry in this embodiment of the control valve apparatus is slightly modified to automatically control such actuation and deactuation of the pump. FIG. 11 schematically illustrates the electrical circuitry and switching arrangement for this embodiment of the control valve apparatus which is identical to the electrical circuitry and switching arrangement 28 of FIG. 10 except in the respects to be presently explained. In this embodiment, the hot lead 164, the neutral lead 192, and the ground lead 166 from the three-pronged connector 168 extend through their cable 194 into the housing of the pump motor, representatively indicated at 210. A conventional double pole switch 212 is provided in the pump motor housing 210 in electrically operative association with the pump motor 214 for actuating operation thereof. The switch 212 has four contacts 216,218,220,222, the contacts 216,218 of which are designted as "in" contacts and the contacts 220,222 of which are designated as "out" contacts, and further includes a pair of bar switch members 230,232 integrally connected with each other for unitary movement into and out of electrical bridging contact between the respective "in" contacts 216,218 and the "out" contacts 220,222. The two "out" contacts 220,222 are respectively connected to the opposite terminals or other conventional connections or contacts provided on the pump motor 214. The hot lead 164 from the connector 168 is electrically connected to the "in" contact 216 and extends therefrom through a cable 294 extending between the pump motor housing 210 and the circuitry and switch arrangement housing 124. The neutral lead 192 from the connector 168 is electrically connected to the contact 218 and extends therefrom through the cable 294 into the housing 124 and therefrom through the cable 200 to the electric motor 30. The ground lead 166 is bolted or otherwise conventionally grounded to an appropriate grounded metal surface in the pump motor housing 210 as representatively indicated at 234 and another ground lead 266 is similarly grounded to the same surface and extends through the cable 294 into the housing 124 wherein the ground lead 266 is appropriately grounded to the support plate 126. A lead 236 is also electrically connected to the "in" contact 218 and extends therefrom to and is electrically connected with one terminal of a conventional electromagnetic coil 240 mounted in the pump motor housing 210. Another lead 238 is electrically connected to the opposite terminal of the coil 240 and extends therefrom through the cable 294 into the housing 124 wherein it is electrically connected both to a lead 242 electrically connected to and extending from the "normally closed" terminal 132NC of the limit switch 132 and to a lead 244 electrically connected to and extending from the "normally closed" terminal 136NC of the limit switch 136. The coil 240 is mounted in the pump motor housing 210 in operative association with the bar switch assembly 230,232 to electromagnetically actuate their movement into bridging electrical contact with the four contact 216,218,220,222 when the coil 240 is energized.

The operation of the embodiment of the control valve apparatus of FIG. 11 will thus be understood. With neither manual switch assembly 128,130 actuated, no electrical circuit is completed and the drive train of the electric motor 30 is disposed in its "centered" starting disposition. Upon depression of the "forward" manual switch assembly 128, an electrical circuit is completed as above described regarding the embodiment of FIG. 10 through the hot lead 164, the manual switch assembly 128, the lead 170, the limit switch 132 between its "common" and "normally open" terminals 132C,132NO, the lead 178, the condensor terminal 186', the lead 188, the electrical motor 30, and the lead 192. After 45 degrees rotational movement of the motor drive train, the cam disk 144 disengages from the limit switch 132 and opens it, stopping the electric motor in one operative disposition as aforedescribed. Upon the opening of the limit switch 132, another electrical circuit is immediately completed through the hot lead 164, the manual switch assembly 128, the lead 170, the limit switch 132 between its "common" and "normally closed" terminals 132C,132NC, the lead 242, the lead 238, the coil 240, the lead 236 and the lead 192, thereby energizing the coil 240 which electromagnetically actuates closing movement of the bar switch assembly 230,232 to complete an electrical circuit between the contacts 216,218,220,222 through the electric pump motor 214 for pumping of hydraulic fluid through the valve assembly 22 to actuate operation of the double-acting cylinder. So long as the "forward" manual switch assembly 128 is manually actuated, this latter-described electrical circuit through the pump motor 214 remains completed for continued operation of the double-acting cylinder. Upon release of the "forward" manual switch assembly 128, this circuit is broken to deactuate the pump motor 214 and also effects the completion of the aforedescribed circuit through the limit switch 134 to actuate reverse return movement of the motor drive train to its "centered" dispositon. Similarly, upon actuation of the "reverse" manual switch assembly 130, an electrical circuit is completed through the hot lead 164, the manual switch assembly 130, the limit switch 136 between its "common" and "normally open" terminals 136C,136NO, the lead 184, the condensor terminal 186", the lead 190, and the lead 192, thereby actuating the electric motor 30 to rotate 45 degrees in the "reverse" direction until the limit switch 136 is released and opened by the cam disk 146. Thereupon, the electric motor is deactuated and another electrical circuit is completed through the hot lead 164, the manual switch assembly 130, the lead 174, the limit switch 136 between its "common" and "normally closed" terminals 136C,136NC, the lead 244, the lead 238, the coil 240, the lead 236, and the lead 192. The coil 240 is thereby energized to electromagnetically move the bar switch assembly 230,232 into switch closing engagement with the contacts 216,218,220,222 to complete another electrical circuit therethrough and through the pump motor 214 to energize it for pumping fluid through the valve assembly 22 for actuation of "reverse" movement of the double-acting cylinder. Upon release of the "reverse" manual switch assembly 130, this electrical circuit is broken to deactuate the pump motor 214 and the aforedescribed "forward" electrical circuit through the limit switch 138 is completed to actuate "forward" return rotation of the drive train of the electric motor 30 to its original "centered" disposition.

As will be understood, the two embodiments of FIGS. 10 and 11 for the present control valve apparatus facilitate a variety of differing uses and applications for the present invention. The embodiment of FIG. 10 in providing for the use of the present control valve apparatus in conjunction with a continuously cycling pump is best adapted for applications calling for frequent and repetitive energizations of the pump such as in production line type uses of the double-acting cylinder or other hydraulically-actuated member operated by the pump. Furthermore, this embodiment best facilitates the control of a valve assembly to be disposed remotely from the associate pump. On the other hand, the embodiment of FIG. 11 of the present control valve apparatus in conjunction with a selectively-actuated, non-continuously running pump is best suited for embodiments wherein less frequent, occasional energizations of the pump and actuations of the double-acting cylinder or other hydraulic member are required and furthermore is best suited to applications wherein the present apparatus and the associated pump are to be constructed as a single unit, e.g., wherein the valve assembly is mounted directly to the pump.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. Control valve apparatus comprising valve means movable between two operative positions and an intermediate inoperative position, a reversible electric motor, shaft means rotatable drivenly by said motor and operatively connected with said valve means for actuating movement thereof, and operating means for electrically controlling operation of said electric motor, said operating means including electrical circuit means for electrically connecting said electric motor with a source of electrical current for rotation of said shaft means in opposite direcitons and switch means in said electrical circuit means for selective manual actuation of said electric motor for rotation of said shaft means in said opposite directions from a centered position thereof wherein said valve means is in its said intermediate inoperative position, for automatically deactuating said electric motor from rotation of said shaft means at each of two moved positions thereof rotated from said centered position thereof respectivley in said opposite directions wherein said valve means is respectively in its said two operative positions, and for automatically actuating reverse operation of said electric motor upon cessation of manual actuation thereof for reverse rotation of said shaft means in return to said centered position.

2. Control valve apparatus according to claim 1 and characterized further in that said switch means includes manually operated switch means in said electrical circuit means, secondary switch means in said electrical circuit means, and cam means rotatably movable in association with said shaft means for automatically operating said secondary switch means.

3. Control valve apparatus according to claim 1 and characterized further in that said electrical circuit means includes primary electrical circuit means for rotation of said shaft means in opposite directions from its said centered position and secondary electrical circuit means for reverse rotation of said shaft means from each of its said moved positions to its said centered position.

4. Control valve apparatus according to claim 3 and characterized further in that said switch means includes manually operated switch means in said electrical circuit means, secondary switch means in said electrical circuit means, and cam means rotatably movable in association with said shaft means for automatically operating said secondary switch means.

5. Control valve apparatus according to claim 3 and characterized further in that said primary circuit means includes a first primary electrical circuit for rotating said shaft means in one direction and a second primary electrical circuit for rotating said shaft means in the opposite direction, and said secondary circuit means includes a first secondary electrical circuit for rotating said shaft means in said opposite direction and a second secondary electrical circuit for rotating said shaft means in said one direction.

6. Control valve apparatus according to claim 5 and characterized further in that said switch means includes a first manual switch means in said first primary and first secondary circuits to be selectively closed in one thereof while simultaneously open in the other thereof, second manual switch means in said second primary and second secondary circuits to be selectively closed in one thereof while simultaneously open in the other thereof, secondary switch means in each said primary and secondary circuit, and cam means rotatably movable in association with said shaft means for closing said secondary switch means in said first and second primary circuits and opening said secondary switch means in said first and second secondary circuits when said shaft means is in said centered position thereof, for opening said secondary switch means in said first primary circuit and closing said secondary switch means in said first secondary circuit when said shaft means is in one said moved position, and for opening said secondary switch means in said second primary circuit and closing said secondary switch means in said second secondary circuit when said shaft means is in the other said moved position.

7. Control valve apparatus according to claim 6 and characterized further in that said first manual switch means is biased to a normal position to be open in said first primary circuit and closed in said first secondary circuit and is manually actuable to an actuated position to be closed in said first primary circuit and open in said first secondary circuit for selective manual actuation of said electric motor for rotation of said shaft means from its said centered position to its said one moved position and for automatic reverse rotation of said shaft means from said one moved position to said centered position upon cessation of manual actuation of said first manual switch means, and in that said second manual switch means is biased to a normal position to be open in said second primary circuit and closed in said second secondary circuit and is manually actuable to an actuated position to be closed in said second primary circuit and open in said second secondary circuit for selective manual actuation of said electric motor for rotation of said shaft means from its said centered position to its other moved position and for automatic reverse rotation of said shaft means from said other moved position to said centered position upon cessation of manual actuation of said second manual switch means.

8. Control valve apparatus according to claim 6 and characterized further in that said cam means is operative for closing said secondary switch means in said second primary circuit and opening said secondary switch means in said second secondary circuit when said shaft means is in its said one moved position and for closing said secondary switch means in said first primary circuit and opening said secondary switch means in said first seondary circuit when said shaft is in its said other moved position.

9. Control valve apparatus according to claim 6 and characterized further in that said cam means is mounted on said shaft means for rotation therewith and said secondary switch means are disposed adjacent said shaft means in the path of rotational movement of said cam means for operation thereby upon rotation of said shaft means.

10. Control valve apparatus according to claim 9 and characterized further in that said secondary switch means in said first and second primary circuits are disposed at a predetermined circumferential spacing about said shaft means and said cam means includes a first cam profiled circumferentially of said shaft means for said opening and closing of said secondary switch means in said first and second primary circuits, and in that said secondary switch means in said first and second secondary circuits are disposed at said predetermined circumferential spacing about said shaft means and said cam means includes a second cam profiled circumferentially of said shaft means for said opening and closing of said secondary switch means in said first and second secondary circuits.

11. Control valve apparatus according to claim 10 and characterized further in that said secondary switch means in said first and second primary circuits and said first cam are generally coplanarly arranged and said secondary switch means in said first and second secondary circuits and said second cam are generally coplanarly arranged in stacked relation with said secondary switch means in said first and second primary circuits and said first cam.

12. Control valve apparatus comprising valve means movable between two operative positions and an intermediate inoperative position, a reversible electric motor, shaft means rotatable drivenly by said motor and operatively connected with said valve means for actuating movement thereof, and operating means for electrically controlling operation of said motor, said operating means comprising electrical circuit means for electrically connecting said electric motor with a source of electrical current for rotation of said shaft means in opposite directions, said electrical circuit means including a first primary circuit for rotating said shaft means in one direction, a second primary circuit for rotating said shaft means in the opposite direction, a first secondary circuit for rotating said shaft means in said opposite direction, and a second secondary circuit for rotating said shaft means in said one direction, first manual switch means in said first primary and first secondary circuits to be selectively closed one thereof while simultaneously open in the other thereof, second manual switch means in said second primary and second secondary circuits to be selectively closed in one thereof while simultaneously open in the other thereof, secondary switch means in each said primary and secondary circuits, and cam means rotatably movable in association with said shaft means for closing said secondary switches in said first and second primary circuits and opening said secondary switches in said first and second primary circuits and opening said secondary switches in said first and second secondary circuits when said shaft means is in a centered position thereof corresponding to said inoperative position of said valve means, for opening said secondary switch in said first primary circuit and closing said secondary switch in said first secondary circuit when said shaft means is in a first position thereof rotated in one direction from said centered position thereof corresponding to one said operative position of said valve means, and for opening said secondary switch in said second primary circuit and closing said secondary switch in said second secondary circuit when said shaft means is in a second position thereof rotated in the opposite direction from said centered position thereof corresponding to the other operative position of said valve means, whereby said shaft means is constrained to reciprocably rotate incrementally between its said centered, first and second positions for controlling movement of said valve means between its said inoperative and operative postions with said manual switch means actuating each such movement and said secondary switch means automatically terminating each such movement.

13. Control valve apparatus according to claim 12 and characterized further in that said first manual switch means is biased to a normal position to be open in said first primary circuit and closed in said first secondary circuit and is manually actuable to an actuated position to be closed in said first primary circuit and open in said first secondary circuit for selective manual actuation of said electric motor for rotation of said shaft means from its said centered position to its said one moved position and for automatic reverse rotation of said shaft means from said one moved position to said centered position upon cessation of manual actuation of said first manual switch means, and in that said second manual switch means is biased to a normal position to be open in said second primary circuit and closed in said second secondary circuit and is manually actuable to an actuated position to be closed in said second primary circuit and open in said second secondary circuit for selective manual actuation of said electric motor for rotation of said shaft means from its said centered position to its other moved position and for automatic reverse rotation of said shaft means from said other moved position to said centered position upon cessation of manual actuation of said second manual switch means.

14. Control valve apparatus according to claim 13 and characterized further in that said cam means is mounted on said shaft means for rotation therewith and said secondary switch means are disposed adjacent said shaft means in the path of rotational movement of said cam means for operation thereby upon rotation of said shaft means.

15. Control valve apparatus according to claim 14 and characterized further in that said secondary switch means in said first and second primary circuits are disposed at a predetermined circumferential spacing about said shaft means and said cam means includes a first cam profiled circumferentially of said shaft means for said opening and closing of said secondary switch means in said first and second primary circuits, and in that said secondary switch means in said first and second secondary circuits are disposed at said predetermined circumferential spacing about said shaft means and said cam means includes a second cam profiled circumferentially of said shaft means for said opening and closing of said secondary switch means in said first and second secondary circuits.

16. Control valve apparatus according to claim 15 and characterized further in that said secondary switch means in said first and second primary circuits and said first cam are generally coplanarly arranged and said secondary switch means in said first and second secondary circuits and said second cam are generally coplanarly arranged in stacked relation with said secondary switch means in said first and second primary circuits and said first cam.

17. Control valve apparatus according to claim 14 and characterized further in that said cam means is operative for closing said secondary switch means in said second primary circuit and opening said secondary switch means in said second secondary circuit when said shaft means is in its said one moved position and for closing said secondary switch means in said first primary circuit and opening said secondary switch means in said first secondary circuit when said shaft is in its said other moved position.

18. Control valve apparatus according to claim 16 and characterized further in that said cam means is operative for closing said secondary switch means in said second primary circuit and opening said secondary switch means in said second secondary circuit when said shaft means is in its said one moved position and for closing said secondary switch means in said first primary circuit and opening said secondary switch means in said first secondary circuit when said shaft is in its said other moved position.

* * * * *

UNITED STATES PATENT OFFICE
CERTIFICATE OF CORRECTION

Patent No. 4,556,832          Dated December 3, 1985

Inventor(s)   John P. Rollins

It is certified that error appears in the above-identified patent and that said Letters Patent are hereby corrected as shown below:

Column 8, Line 66, delete "basicallly" and insert therefor -- basically -- .

Column 9, Line 55, delete "th" and insert therefor -- the -- .

Column 14, Lines 18-19, delete "designted" and insert therefor -- designated -- .

Column 16, Line 32, delete "direcitons" and insert therefor -- directions -- .

Column 16, Line 40, delete "respectivley" and insert therefor -- respectively -- .

Signed and Sealed this

Fifteenth Day of April 1986

[SEAL]

Attest:

DONALD J. QUIGG

Attesting Officer    Commissioner of Patents and Trademarks